Jan. 15, 1929.
R. H. WENTORF ET AL
1,698,926
BASE FOR COOKING UTENSILS
Filed Dec. 6, 1926
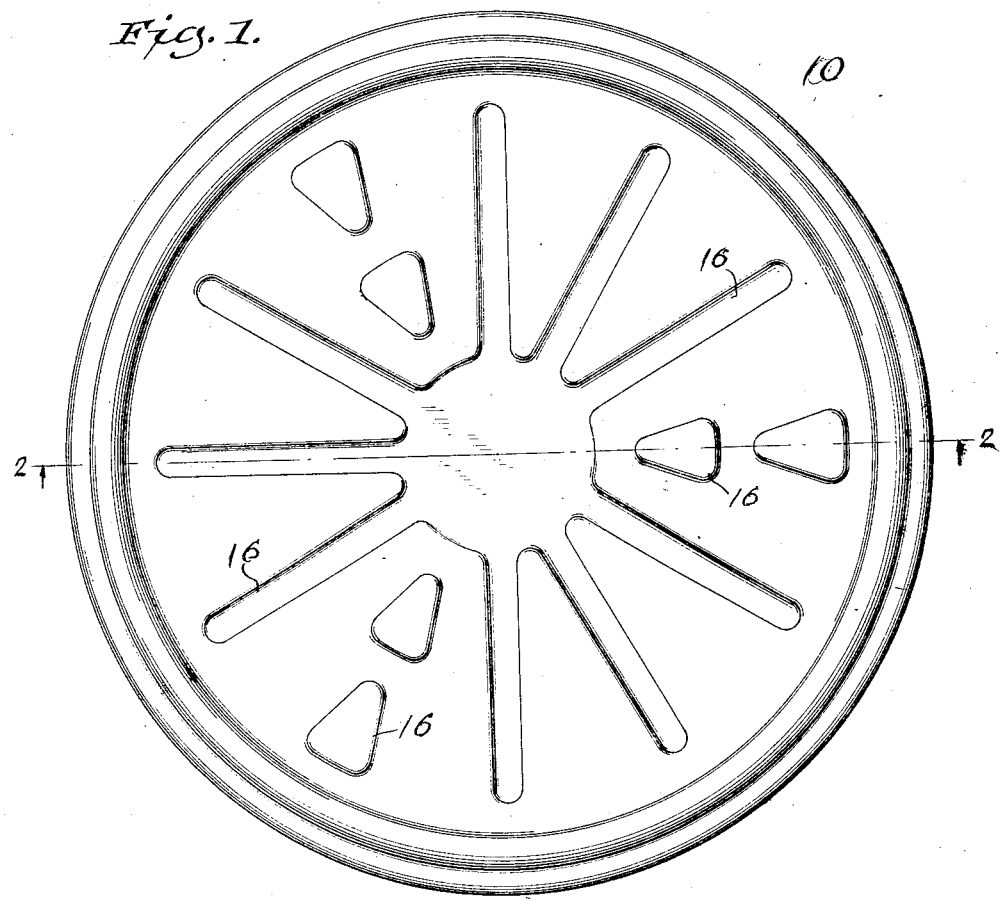
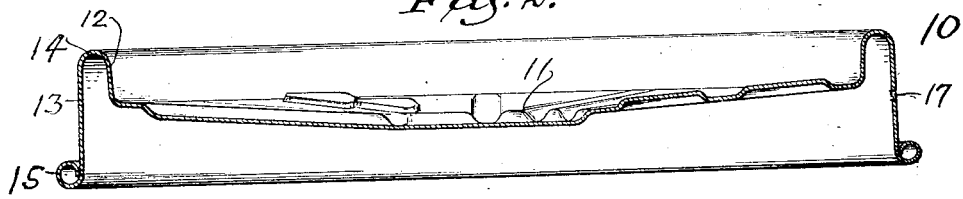
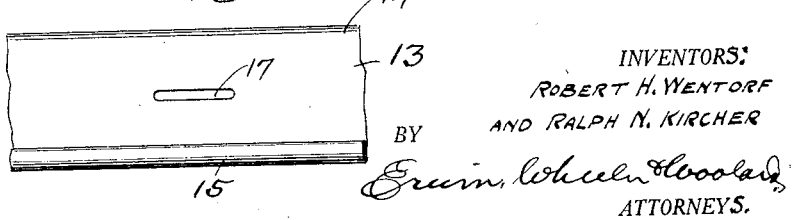
WITNESS:
Fred Palm
DEL.
INVENTORS:
ROBERT H. WENTORF
AND RALPH N. KIRCHER
BY
Erwin, Wheeler & Woodard
ATTORNEYS.

Patented Jan. 15, 1929.

1,698,926

UNITED STATES PATENT OFFICE.

ROBERT H. WENTORF AND RALPH N. KIRCHER, OF WEST BEND, WISCONSIN, ASSIGNORS TO WEST BEND ALUMINUM COMPANY, OF WEST BEND, WISCONSIN, A CORPORATION OF WISCONSIN.

BASE FOR COOKING UTENSILS.

Application filed December 6, 1926. Serial No. 152,856.

Our invention relates to cooking or heating vessels and utensils, and is specifically applicable to use in connection with cooking or heating utensils of the waterless type, but is capable of use with such utensils of other types.

The purpose of the invention is the production of a base which is designed to be interposed between the flame and the vessel containing the substances to be cooked or heated, and to maintain such a desired temperature within the vessel as will effect proper cooking without scorching the substances therein, or causing them to stick during the cooking or heating process.

The invention resides in a peculiar construction of base whereby its purposes as above stated are achieved, and it consists in an integrally formed article, on the upper face of which the vessel containing the materials to be cooked is supported at separated points, so that the actual metal-to-metal contact is reduced to a minimum, and an insulating layer of air is provided as a medium for transmitting the heat of the flame through the base to the vessel in a greatly retarded but regulated degree.

The base is of circular form, and the supporting surface thereon is depressed at the upper side so as to constitute a seat for the cooking vessel, while at its underside the base is open to provide a cavity in which the heat from the flame is conserved and distributed over the whole of the under surface of the vessel support.

We further provide our improved base with means whereby the same may be conveniently moved, when too hot for ordinary handling.

These, and other details of construction residing in our invention, will now be specifically described, and the novelty thereof pointed out in the appended claims.

In the accompanying drawing:

Figure 1 is a plan view showing a base constructed in accordance with our invention.

Fig. 2 is a central vertical sectional view, on the line 2—2, Fig. 1, looking in the direction of the arrows, and showing the construction of our invention.

Fig. 3 is a fragmentary view in elevation, looking from the right in Fig. 2, and showing the means which we have provided for conveniently moving the base when the latter is too hot to be handled without discomfort.

In the drawing, the numeral 10 designates our invention as a whole, the same comprising a base which is formed as a stamping out of a disc of sheet metal of suitable nature and gauge. The central portion of the sheet is depressed below the plane of the disc so as to form a support or seat 11 for a cooking or heating vessel or utensil. A substantially circular and approximately vertical wall 12 is produced in the formation of the said depression or seat. The margin of the disc lying outside of the wall 12 is turned so as to form a second circular wall 13 which stands approximately vertical, the two circular walls being concentric, but slightly separated. The metal connecting the upper parts of the walls 12 and 13, forms a bridge 14 for the space separating the same, and is conveniently rounded on all radial lines so as to impart a finished appearance to the article. The narrow outermost margin of the disc is returned upon itself, so as to form a bead 15 encircling the wall 13 at its base.

The circular bead 15 constitutes the footing for the structure, and through the walls 12 and 13 and bridge 14 the seat 11 is maintained in a state of suspension a suitable distance above the lower plane of the base, so that an inverted cup is formed for conserving the heat generated by the flame, and utilizing such heat to the greatest possible extent.

In order to prevent scorching or burning of the contents of the cooking vessel or utensil, which in use, is supported in the circular seat 11, it is desirable to reduce in a very large measure the metal-to-metal contact of the interposed seat 11, which is directly exposed to the flame, and the bottom of the coking vessel or utensil. We have found that by providing on the seat 11 of the base, isolated supports by the use of which the metal-to-metal contact is greatly reduced, that liability to scorching or burning is eliminated. We achieve this result by providing upon the upper face of the seat 11, a plurality of embossments 16, which may stand radially or otherwise with respect to the vertical axis of the base 10, but in such manner as to constitute concentrically arranged series of isolated contact points for supporting the cooking vessel or utensil, irrespective of the diameter of the latter. The formation of the seat 11 with a slight concavity is conducive to better positioning of the cooking vessels or utensils upon the base. The separated points of contact between the bottom of the cooking vessel or utensil and the seat 11 of the base upon which it rests, provides between those surfaces a large area of air insulation, which provision we find retards the passage of the heat in a very material degree, and distributes it much more evenly and with less intensity. A circular heat conserving channel is formed in the base by the conjunction of the walls 12 and 13 and the annular bridge 14. We have found by extensive experiment with our invention, that the cooking process can be more satisfactorily carried out, with a minimum consumption of energy.

At the conclusion of a cooking or heating operation, it is generally desirable to remove the base 10 from the position which is occupied during the cooking operation, but the base at such times is too hot to be moved manually without discomfort and some danger. In order to overcome the objection, and afford means for quickly removing the base, we provide one or more elongated substantially horizontal openings 17 in the wall 13, in which the blade of a knife may be inserted and the purpose desired accomplished without discomfort, the free end of the inserted implement engaging the seat at its lower side.

Having thus described our invention, what we claim and desire to secure by Letters Patent of the United States, is:

1. A sheet metal base for cooking utensils having a seat suspended from its top for supporting a vessel, the said seat being constituted entirely of sheet metal provided upon its upper side with a plurality of isolated projections, whereby the metal-to-metal contact of the vessel with its seat is reduced, and air insulation provided by the unfilled open spaces between the projections to avoid burning of the substances in the vessel.

2. A raised sheet metal base for cooking utensils having an outer supporting wall and an inner wall depending therefrom, the said inner wall having connected therewith a suspended seat for supporting a vessel, the said seat being constituted entirely of metal provided upon its upper side with a plurality of separated contact points, whereby the metal-to-metal contact of the vessel with the seat is reduced, and air insulation provided by the unfilled open spaces between the projections to avoid burning of the substances in the vessel.

3. A sheet metal base for cooking utensils having a vertical outer circular wall and an inner depending seat for a vessel suspended from the said wall, the said wall being provided with an elongated substantially horizontal opening for insertion of an implement to engage the lower side of the seat, whereby the base, when heated, may be moved without discomfort.

In witness whereof, we have signed our names at West Bend, this 4th day of December, 1926.

ROBERT H. WENTORF.
RALPH N. KIRCHER.